(12) United States Patent
Yu

(10) Patent No.: US 7,644,127 B2
(45) Date of Patent: Jan. 5, 2010

(54) EMAIL ANALYSIS USING FUZZY MATCHING OF TEXT

(75) Inventor: Tonny Yu, Hillsborough, CA (US)

(73) Assignee: GoZoom.com, Inc., San Francisco, CA (US)

( * ) Notice: Subject to any disclaimer, the term of this patent is extended or adjusted under 35 U.S.C. 154(b) by 833 days.

(21) Appl. No.: 11/077,506

(22) Filed: Mar. 9, 2005

(65) Prior Publication Data

US 2005/0262210 A1 Nov. 24, 2005

Related U.S. Application Data

(60) Provisional application No. 60/551,959, filed on Mar. 9, 2004.

(51) Int. Cl.
*G06F 15/16* (2006.01)

(52) U.S. Cl. ..................... 709/206

(58) Field of Classification Search ............. 709/206
See application file for complete search history.

(56) References Cited

U.S. PATENT DOCUMENTS

| | | |
|---|---|---|
| 5,694,616 A | 12/1997 | Johnson et al. |
| 5,742,769 A | 4/1998 | Lee et al. |
| 5,781,857 A | 7/1998 | Hwang et al. |
| 5,809,020 A | 9/1998 | Bruckert et al. |
| 5,822,526 A | 10/1998 | Waskiewicz |
| 5,878,230 A | 3/1999 | Weber et al. |
| 5,978,799 A | 11/1999 | Hirsch |
| 5,987,609 A | 11/1999 | Hasebe |
| 5,999,967 A | 12/1999 | Sunsted |
| 6,023,723 A | 2/2000 | McCormick et al. |
| 6,052,709 A | 4/2000 | Paul |
| 6,104,500 A | 8/2000 | Alam et al. |
| 6,108,688 A | 8/2000 | Nielsen |
| 6,108,691 A | 8/2000 | Lee et al. |

(Continued)

OTHER PUBLICATIONS

Graham-Cumming, John; *Welcome to POPFile*; SourchForge.net © 2001-2004; pp. 1-5; @http://popfile.sourchforgenet/old_index.html.

(Continued)

*Primary Examiner*—Andrew Caldwell
*Assistant Examiner*—Jason Recek
(74) *Attorney, Agent, or Firm*—Fliesler Meyer LLP

(57) ABSTRACT

Translation of text or messages provides a message that is more reliably or efficiently analyzed for purposes as, for example, to detect spam in email messages. One translation process takes into account statistics of erroneous and intentional misspellings. Another process identifies and removes characters or character codes that do not generate visible symbols in a message displayed to a user. Another process detects symbols such as periods, commas, dashes, etc., interspersed in text such that the symbols do not unduly interfere with, or prevent, a user from perceiving a spam message. Another process can detect use of foreign language symbols and terms. Still other processes and techniques are presented to counter obfuscating spammer tactics and to provide for efficient and accurate analysis of message content. Groups of similar content items (e.g., words, phrases, images, ASCII text, etc.) are correlated and analysis can proceed after substitution of items in the group with other items in the group so that a more accurate detection of "sameness" of content can be achieved. Dictionaries are used for spam or ham words or phrases. Other features are described.

20 Claims, 3 Drawing Sheets

U.S. PATENT DOCUMENTS

| | | | |
|---|---|---|---|
| 6,118,856 | A | 9/2000 | Paarsmarkt et al. |
| 6,141,695 | A | 10/2000 | Sekiquchi et al. |
| 6,161,130 | A | 12/2000 | Horvitz et al. |
| 6,199,103 | B1 | 3/2001 | Sakaguchi et al. |
| 6,223,213 | B1 | 4/2001 | Cleron et al. |
| 6,249,807 | B1 | 6/2001 | Shaw et al. |
| 6,272,532 | B1 | 8/2001 | Feinleib |
| 6,282,565 | B1 | 8/2001 | Shaw et al. |
| 6,289,214 | B1 | 9/2001 | Backstrom |
| 6,304,898 | B1 | 10/2001 | Shiigi |
| 6,321,267 | B1 | 11/2001 | Donaldson |
| 6,324,569 | B1 | 11/2001 | Ogilvie et al. |
| 6,330,589 | B1 | 12/2001 | Kennedy |
| 6,330,590 | B1 | 12/2001 | Cotten |
| 6,351,523 | B1 | 2/2002 | Detlef |
| 6,363,414 | B1 | 3/2002 | Nicholls et al. |
| 6,374,292 | B1 | 4/2002 | Srivastava et al. |
| 6,401,112 | B1 | 6/2002 | Boyer et al. |
| 6,405,225 | B1 | 6/2002 | Apfel et al. |
| 6,405,243 | B1 | 6/2002 | Nielson |
| 6,413,000 | B1 | 7/2002 | Borcherds et al. |
| 6,421,709 | B1 * | 7/2002 | McCormick et al. ........ 709/206 |
| 6,424,426 | B1 | 7/2002 | Henry |
| 6,438,584 | B1 | 8/2002 | Powers |
| 6,443,841 | B1 | 9/2002 | Rossides |
| 6,446,115 | B2 | 9/2002 | Powers |
| 6,446,261 | B1 | 9/2002 | Rosser |
| 6,460,075 | B2 | 10/2002 | Krueger et al. |
| 6,473,812 | B2 | 10/2002 | Motoyama |
| 6,487,586 | B2 | 11/2002 | Ogilvie et al. |
| 6,502,127 | B1 | 12/2002 | Edwards et al. |
| 6,522,421 | B2 | 2/2003 | Chapman et al. |
| 6,526,042 | B1 | 2/2003 | Pinard et al. |
| 6,529,908 | B1 | 3/2003 | Piett et al. |
| 6,539,385 | B1 | 3/2003 | Pollack et al. |
| 6,546,416 | B1 | 4/2003 | Kirsch |
| 6,546,417 | B1 | 4/2003 | Baker |
| 6,580,787 | B1 | 6/2003 | Akhteruzzaman et al. |
| 6,587,871 | B1 | 7/2003 | Schrader |
| 6,591,296 | B1 | 7/2003 | Ghanime |
| 6,592,627 | B1 | 7/2003 | Agrawal et al. |
| 6,600,750 | B1 | 7/2003 | Joffe et al. |
| 6,614,551 | B1 | 9/2003 | Peek |
| 6,615,241 | B1 | 9/2003 | Miller et al. |
| 6,643,687 | B1 | 11/2003 | Dickie et al. |
| 6,651,879 | B2 | 11/2003 | Lapstun et al. |
| 6,654,787 | B1 | 11/2003 | Aronson et al. |
| 6,671,718 | B1 | 12/2003 | Meister et al. |
| 6,684,088 | B1 | 1/2004 | Halahmi |
| 6,684,238 | B1 | 1/2004 | Dutta |
| 6,691,156 | B1 | 2/2004 | Drummond et al. |
| 6,732,157 | B1 | 5/2004 | Gordon et al. |
| 6,779,021 | B1 | 8/2004 | Bates et al. |
| 6,842,773 | B1 | 1/2005 | Ralston et al. |
| 7,194,515 | B2 | 3/2007 | Kirsch |
| 7,194,681 | B1 | 3/2007 | Horvitz |
| 7,206,814 | B2 | 4/2007 | Kirsch |
| 7,219,148 | B2 | 5/2007 | Rounthwaite et al. |
| 7,249,162 | B2 | 7/2007 | Rounthwaite et al. |
| 7,272,853 | B2 | 9/2007 | Goodman et al. |
| 7,287,060 | B1 | 10/2007 | McCown et al. |
| 7,289,949 | B2 | 10/2007 | Warner et al. |
| 7,299,261 | B1 | 11/2007 | Oliver et al. |
| 7,353,539 | B2 | 4/2008 | Brawn et al. |
| 7,366,761 | B2 | 4/2008 | Murray et al. |
| 7,406,502 | B1 | 7/2008 | Oliver et al. |
| 7,412,723 | B2 | 8/2008 | Blake et al. |
| 7,483,947 | B2 * | 1/2009 | Starbuck et al. ............. 709/206 |
| 7,483,951 | B2 | 1/2009 | Kirsch |
| 2002/0103914 | A1 * | 8/2002 | Dutta et al. ................. 709/229 |
| 2003/0158725 | A1 * | 8/2003 | Woods ........................ 704/10 |
| 2003/0212745 | A1 | 11/2003 | Caughey |
| 2004/0039786 | A1 | 2/2004 | Horvitz |
| 2004/0087300 | A1 * | 5/2004 | Lewis ...................... 455/412.2 |
| 2004/0093384 | A1 | 5/2004 | Shipp |
| 2004/0107386 | A1 * | 6/2004 | Burdick et al. ................ 714/38 |
| 2004/0260776 | A1 | 12/2004 | Starbuck et al. |
| 2005/0060643 | A1 * | 3/2005 | Glass et al. ............. 715/501.1 |
| 2005/0080860 | A1 * | 4/2005 | Daniell et al. ............... 709/206 |
| 2005/0193073 | A1 * | 9/2005 | Mehr et al. ................. 709/206 |
| 2007/0118904 | A1 * | 5/2007 | Goodman et al. ............. 726/22 |

OTHER PUBLICATIONS

Yerzunis et al.; *Spam Conference 2005 Abstracts*; pp. 1-14; @http://spamconference.org/abstracts.html.

Ahmed et al.; *Word Stemming to Enhance Spam Filtering*; Department of Computer Science & Engineering, University of Dhaka, Bangladesh; pp. 1-2.

Moore, et al.; Mailshell, the OEM Anti-Spam Leader; http://www.mailshell.com/mail/client/oem2.html/step/ip.

Graham, Paul, "A Plan for Spam," Aug. 2002, 8 pages http://paulgraham.com/spam.html.

Oudot, Laurent, "Fighting Spammers with Honeypots: Parts 1 and 2," Nov. 26, 2003, 15 pages.

Sahami, Mehran, et al., "A Bayesian Approach to Filtering Junk E-Mail," AAA'98 Workshop on Learning for Text Categorization, Jul. 27, 1998, Madison, WI, 8 pages.

* cited by examiner

EMAIL ANALYSIS USING FUZZY MATCHING OF TEXT

CLAIM OF PRIORITY

This invention claims priority from U.S. Provisional Patent Application Ser. No. 60/551,959 filed on Mar. 9, 2004 which is hereby incorporated by reference as if set forth in full in this specification. This application is related to co-pending U.S. patent application Ser. No. 11/076,577 filed on Mar. 8, 2005 which is hereby incorporated by reference as if set forth in full in this specification.

COMPUTER PROGRAM LISTING APPENDIX

A portion of the disclosure recited in the specification contains material which is subject to copyright protection. Specifically, a Computer Program Listing Appendix ("Appendix") is provided on a compact disc in accordance with 37 CFR 1.52(e). The Appendix includes source code instructions for a process by which embodiments of the present invention can be practiced in a computer system. The copyright owner has no objection to the facsimile reproduction of the specification as filed in the Patent and Trademark Office. Otherwise all copyright rights are reserved.

The compact disc submission includes two compact discs each having a single, identical ASCII text file named "fuzzy.txt". The file size is 43 kilobytes. The file was created on the compact discs on Mar. 8, 2005. The compact discs are in the IBM-PC machine format and are compatible for reading with MS-DOS and MS-WINDOWS operating systems. The Appendix is hereby incorporated by reference as if set forth in full in this document for all purposes.

BACKGROUND OF THE INVENTION

This invention is related in general to processing of digital information and more specifically to the sending, delivery, analysis and other processing of electronic mail (email) messages.

Although email has become immensely popular and is a huge benefit for many users, today's email systems are also plagued by increasing numbers of unwanted mail, referred to as "spam." Spam email has reached such large proportions with respect to desired email that systems are now sought to defeat the sending and delivery of spam. Typically email is transferred over networks such as home or small-area networks, local-area networks (LANs), wide-area networks (WANs) and, ultimately, global networks such as the Internet. Although email represents the most popular general information exchange mechanism, the problem of unwanted information can include any type of information transfer over a digital network such as instant messaging, chat, newsgroups, file transfers, etc.

Spam is often difficult to detect because, in a broad sense, it is merely information that a recipient does not want. The analysis of an email message can attempt to determine the contents and meaning of a message, quantity of a message (i.e., whether it is a "bulk" message), sender, recipient, delivery path, and other characteristics in order to classify a message as spam. However, spam senders, or "spammers," are aware of such analysis techniques and use different tactics to make messages difficult to analyze automatically. Such "obfuscation" is designed to convey one message to a human reader but provide a different representation to a process executing on a machine. For example, to prevent certain words from being recognized by a process yet still be recognized by a human one tactic is to use slightly different spellings of the word such as "viagaraaa" instead of "viagra". Another tactic is to include invisible character codes in a message so that the character codes do not result in any visible effect on a displayed message yet appear as characters that are taken in to consideration by an analysis process.

Thus, it is desirable to provide features for text and message analysis that work effectively even on obfuscated text and messages.

SUMMARY OF THE INVENTION

A preferred embodiment of the invention provides various functions for translating message text into a standardized format that is easier to analyze efficiently. One application is in the detection and suppression of unwanted email spain. One translation process takes into account statistics of erroneous and intentional misspellings. Another process identifies and removes characters or character codes that do not generate visible symbols in a message displayed to a user. Another process detects symbols such as periods, commas, dashes, etc., that are interspersed in text such that the symbols do not unduly interfere with, or prevent, a user from perceiving a spam message. Another process can detect use of foreign language symbols and terms. Still other processes and techniques are presented to counter obfuscating spammer tactics and to provide for efficient and accurate analysis of message content.

Groups of similar content items (e.g., words, phrases, images, ASCII text, etc.) are correlated and analysis can proceed after substitution of items in the group with other items in the group so that a more accurate detection of "sameness" of content can be achieved. Dictionaries are used for spam or ham words or phrases. Several different aspects of routines to perform translation and/or analysis are presented. Source code examples are included in the Appendix.

In one embodiment the invention provides a method for analyzing character codes in text, the method comprising parsing the character codes; determining that a character code would create an undesirable message image when the character codes are displayed; and processing the character code to produce translated text.

DETAILED DESCRIPTION OF THE INVENTION

Figure 1:
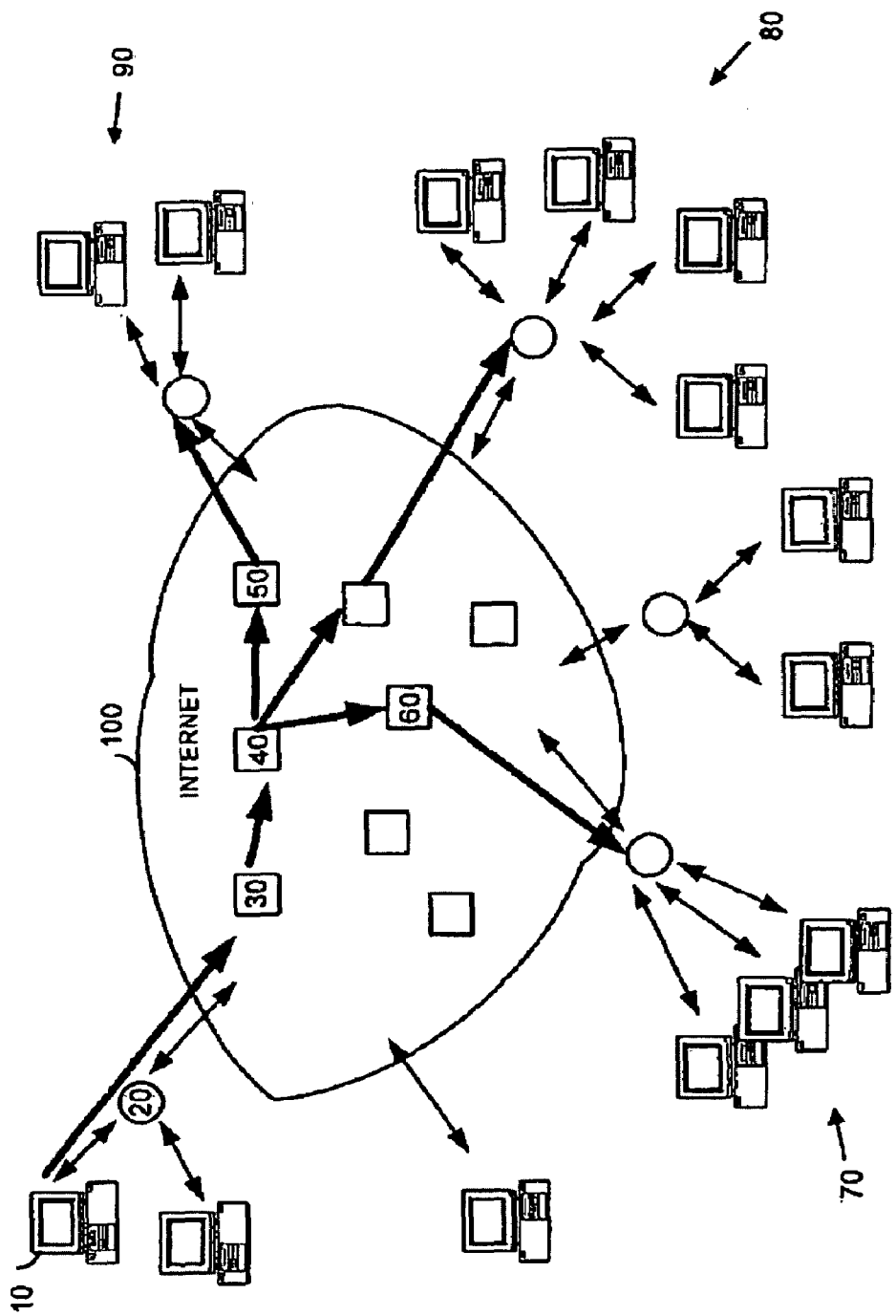
FIG. 1 is a prior art diagram of an email network.

FIG. 1 illustrates general characteristics of an email system using a digital network such as the Internet. Although the invention is discussed primarily with respect to email transferred over the Internet, any suitable network, network topology, transmission protocols, sender-receiver devices and relationships, and other characteristics or properties of electronic devices, processes and transmission methods ca n be used. For example, features of the invention can be employed on a smaller scale to local area networks (LANs), campus or corporate networks, home networks, etc.

In FIG. 1, a sender at a client computer such as client computer 10 can create and send an email message to email server 20. Email server 20 transfers the email over Internet 100 to recipients at 70, 80 and 90. The email can be transferred, for example, through servers such as 30, 40, 50 and 60 before reaching local email servers that provide the email to the intended recipients. In the case of spam email, the email is usually intended for many thousands, hundreds of thousands, or more recipients. The diagram in FIG. 1 is a much simplified depiction of the Internet and a user base. In general, any number of users, devices, components and processes, in one or more networks can make up an email distribution system. The communication channels can be optical, wired, wireless, or other transmission means.

Although embodiments of the invention are discussed primarily with respect to client-server architecture, any acceptable architecture, topology, protocols, or other network and digital processing features can be employed. In general, servers 30, 40, 50 and 60 can be any device with processing ability or other functionality. For example, some of the functions described herein can be performed with devices that are considered clients, such as a user computer system. It is also possible that functionality relevant to the present invention can be included in a router, switch, storage device or other device.

Any type of processing devices can be used to send and receive email. For example, portable computing devices such as a personal digital assistant (PDA), cell phone, laptop computer, or other devices can be employed. In general, the devices and manner of specific processing (including location and timing) are not critical to practicing important features of the present invention.

In FIG. 1, the bold arrows show the path of email transfer, from sender 10 through local email server 20 through other servers to recipients at 70, 80 and 90. The adaptable design of the Internet often means that the particular servers through which information travels is unpredictable. In some cases, an Internet service provider (ISP) or other entity that provides email services may operate one or more email servers, and at least the initial, or final, servers that are used in an email transfer will be guaranteed to flow through the ISP servers from a given sender or for a given recipient. However, in the general case it is difficult to determine the intermediary servers (or other network devices) through which the email flows.

The bold arrows in FIG. 1 illustrate propagation and multiplication of an email message. Multiplication, or replication of email can occur at any point where there is a processor. For example, sender 10 can execute a program on the sender's computer to generate a single email with a long list of intended recipients. In such case the single email may be replicated at email server 20, or may be replicated at subsequent points, such as at intermediary server 40, where it can be transferred to other servers for replication, routing and ultimate delivery. This approach has drawbacks for the bulk email sender since it is easy to detect such bulk mailings and to block, or filter, identical email messages intended for many recipients.

Another approach for a bulk email sender is to vary the text of the messages and to send each variation of the message to a subset of the intended recipients while spacing the deliveries over time. The variation of an original email message can be done automatically and the sending over time can also be automated as where periodic mailings are performed on a schedule. The automation of this approach can occur at any servers (or other devices) that are connected to the Internet or to a subnetwork. With this approach it can be very difficult to detect and block unwanted (i.e., spam) email. One embodiment of the invention provides for "analyzing" email transmissions. Email words or phrases can be checked to determine whether a message is wanted by a recipient, or whether the message might be unwanted spam.

Different approaches exist for determining whether an email message is unwanted email, or spam, or whether the email message is wanted email, or "ham." Spam has distinguishing characteristics or attributes from ham, but generally these attributes must be statistically analyzed and the outcome of the analysis is a probability (and not a certainty) that a message is spam or ham.

In order to improve the statistical success of spam attribute analysis, one embodiment of the invention provides a way to modify analysis parameters as more data becomes available, and as results of previous analysis are compared to current (and changing) data. One embodiment of the invention provides methods to combine the results of many rules into a single probability score.

Spammers try to obfuscate, or hide, the use of words that are often linked to spam. For example, "Viagra" can be substituted with other pharmacology terms for essentially the same drug. Or the word can be purposely misspelled such as replacing "Viagra" with "Viaagra". A phrase such as "lowest insurance rates" can be substituted with "lower your insurance now." Each substitution of a word or phrase for another that has essentially the same meaning makes it difficult to detect that email messages are the same in meaning.

One embodiment provides a thesaurus of words, phrases, symbols, images, or other items that can have the same meaning and indicates the correlation between two or more of the items. Thus, an item is looked up in the thesaurus by a matching process and any related item with a high correlation can be substituted during an analysis of the content of the messages. The degree of correlation can be used in a calculation of the sameness of the message with other messages in order to determine if the message is bulk and/or spam.

The presence of intentionally misspelled spam-like words is also used as an indication that a message could be spam. For example, one obfuscating tactic is to use misspellings so that the word will not match a dictionary word with an automatic lookup, but which are similar enough to their correctly-spelled counterpart so that a human reader will recognize the word. In other cases, word or phrase substitutions are made so the message might look less like a commercial message or offer for sale. The more likely a word would be the target of analysis or keyword checking, the harder a spammer might try to obfuscate the word. For example, some common spammer misspellings and substitutions are shown in Table I.

TABLE I

1. Viagra online (also: xanax, valium, xenical, phentermine, soma, celebrex, valtrex, zyban, fioricet, adipex, etc.)
2. Online pharmacy (also online prescriptions; meds online)
3. Get out of debt (also: special offer)
4. Get bigger (also: satisfy your partner; improve your sex life)
5. Online degree (also: online diploma)
6. Lowest mortgage rates (also: lower your mortgage rates; refinance; refi)
7. Lowest insurance rates (also: lower your insurance now)
8. Work from home (also: be your own boss)
9. Hot XXX action (also: teens; porn)
10. As seen on oprah (also: as seen on tv)

Rules can be added for substituting, or translating, common spammer words or phrases (e.g., misspellings as described above, phrase substitutions as shown in Table I, etc.) with the "target" phrase that was replaced by the spammer phrase. This pre-processing results in a more standardized message that can then be submitted for analysis such as detecting "sameness" according to the approaches described in the related applications cited above.

Rules can also be used to detect and translate other spam variants or obfuscations. Another spam variant is to include American Standard Code for Information Interchange (ASCII) symbols, or "art." For example, using a backward and forward slash combination as "V" can be used as a substitute for a "V" to produce "Viagra". One rule can replace each occurrence of the combination of slashes (e.g., two ASCII codes) with a character code for an upper or lower case "V" (also typically an ASCII code).

Other translations are possible during rule pre-processing of a message such as deleting "whitespace" characters (e.g., spaces, tabs, line returns, etc.); removing unobtrusive characters such as interspersed periods (e.g., as in "v.i.a.g.r.a"); undoing numeric substitutions for letters (e.g., a number 3 for an E, a number 1 for an I or l (lowercase letter "L"), etc. Another obfuscation is to use a different alphabet or character set that might not display, or might display in a confusing manner. For example, an "a" in a Cyrillic alphabet displays identically to an "a" in the English alphabet but can have different character codes. A German umlaut looks similar to an English "u". A rule can be used so that any symbol that is visually similar to a letter or character is replaced by the similar and more standard character so that a sameness determination can be made on the standardized message. Another spammer tactic is to use characters of the same color as the background color interspersed with visible characters so that the interspersed invisible characters do not interfere with human perception but will interfere with machine parsing of the message. In general, any rule that helps to make a machine interpretation of a message more similar to a human perception or understanding of the message can be used in pre-processing.

Rules can be made to adapt to changing spammer tactics so that translations can evolve based on statistical occurrences of types of obfuscations. For example, a dictionary of common types of spammer words and phrases can be maintained. Such a dictionary would grow over time as more spammer words and phrases are identified. The dictionary could be maintained as a thesaurus with a standardized word or phrase associated with the spammer words or phrases to assist with pre-processing translations.

A ham dictionary of standardized words can also be maintained to be able to detect new legitimate words that enter the lexicon or evolving modern jargon. The ham dictionary can be updated automatically by algorithmic detection of new words, or the ham dictionary can be updated periodically as by downloading from a website, having data added by a human operator, etc. Words can be collected from known legitimate email and newsletters such as web pages from known reputable sites, email from trusted users, etc. Such evolving types of words such as trademark names, proper nouns, domain names, stock symbols, etc., can be updated in this manner. Dictionaries can be maintained in different languages. Known identified spam terms can be indicated automatically or manually and used to update the spam dictionaries. For example, a user can be provided with an interface for entering new spam or ham words. Such lists of word updates can be disseminated among users, network administrators, or among network processes for automated updating. Variations of words both spam and ham can be provided by human users or from programs.

Figure 2:
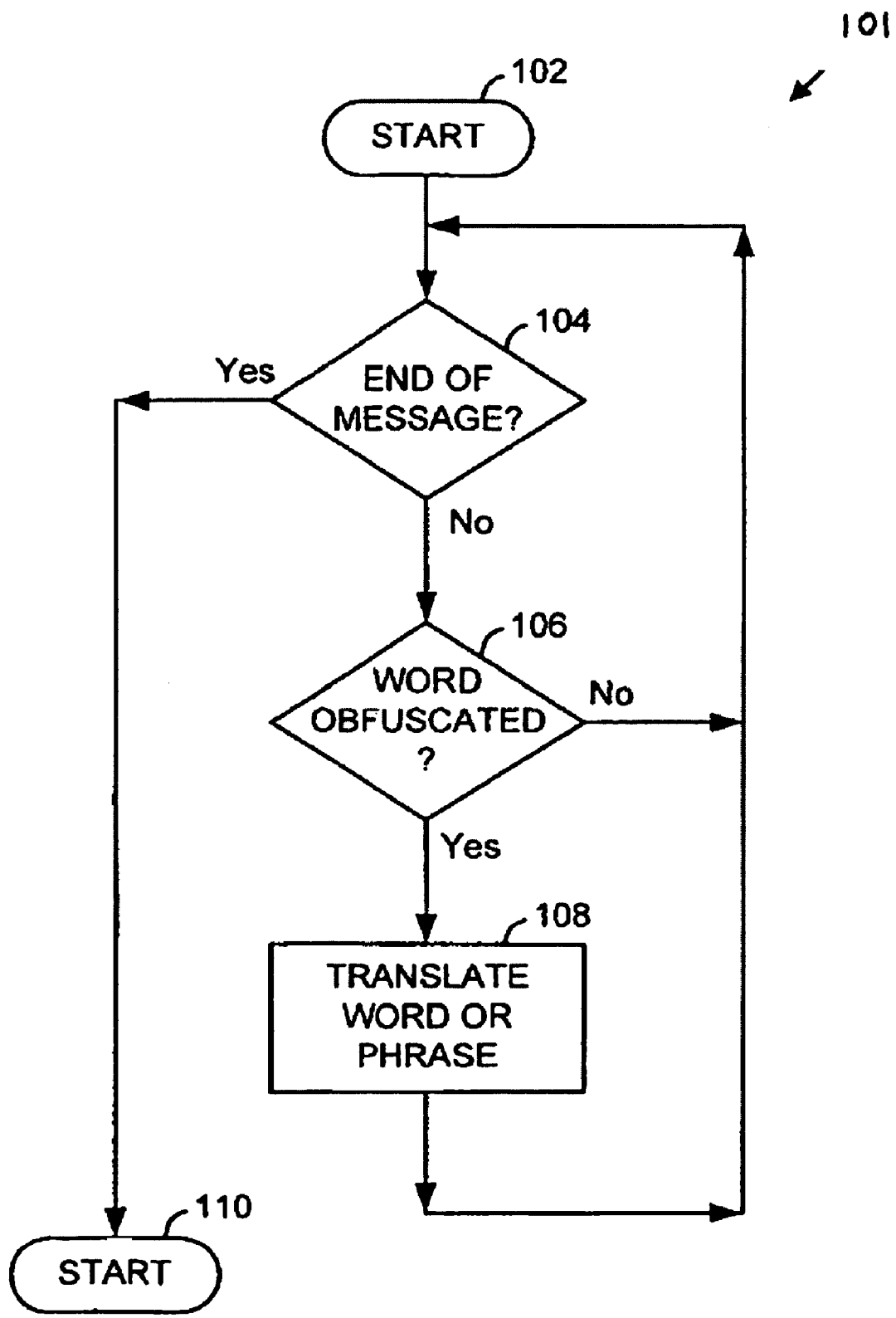
FIG. 2 shows a flowchart of a message translation.

FIG. 2 shows flowchart 101 including basic steps for translating a message or other text. The routine of flowchart 101 is entered at 102 when a message to be translated (e.g., an email message) is obtained. At step 104 a check is made for the end of message. If it is not the end of the message execution proceeds to step 106 where a check is made as to whether the current word (or phrase) is obfuscated. Obfuscation checks can be for any of the forms described herein, or any other types of obfuscation or message information that are designed to make automatic analysis of the message inaccurate with respect to what a human viewer of the displayed message might perceive. The check at 106 is made using character codes, or other digital representation of the message.

If the word is not obfuscate then execution returns to step 104 where a check is made again for the end of message and subsequent words are obtained successively at 106. If step 106 determines that a word is obfuscated then the word is translated at step 108 into a form that is more reliably analyzed or processed as, for example, to determine if the message is spam. After translation execution returns again to step 104 to repeat the checking and translating steps until an end of message is encountered and the routine terminates at step 110. Typically, the translated message is then provided to an analysis process that can be as described herein, in the related patent applications referenced above, or other types of analysis known or to be developed.

Design details for translating and analyzing text include the following:
  Collect known spam.
  For each word/phrase in the spam dictionary, search for a "close" match in the spam message.
  Compute the number and type of transformations (e.g. letter subsitutions) required to
  convert the word/phrase in the spam message to the word/phrase in the spam dictionary.
  Each type of transformation has a weight. Sum the weight of all transformations required to match the word/phrase in the spam dictionary. If it is below a threshold then assume that it is close enough.
  For the word/phrase in the spam message which is close enough, try and match that word/phrase
  to the ham dictionary. Sum the weight of all transformations required to match the word/phrase
  to the ham dictionary. Divide this ham transformation weight by the weight of the spam
  transformation. If it is below a threshold, then assume that the word/phrase in the
  spam message is a new "spam indicator"
  Create a list of "spam indicators" and search for them in incoming messages Transformations:
  remove spaces
  delete non-alpha characters
  delete alpha characters
  add characters
  replace non-alpha characters
  replace alpha characters Examples for Viagra:
  Vi-agra
  VlAgR Alternative:
  Run a CRM114 or N-gram search and extract N-gram matches.
  Allow user to enable fuzzy matching. Allow regular expressions.

One embodiment uses three components to the fuzzy match system:

I. Detection: determine whether text has been purposely obfuscated versus legit use of the word or an accidental mispelling of the word.

II. Deobfuscation: map the obfuscated text to the intended text. Use the intended text for bulk detection and "sameness" detection.

III. Effect on spam scoring: the more occurences of obfuscated text and the more likely that the text was intentionally obfuscated, the more the message is penalized (i.e. higher spam score).

Appendex B contains various reasonable fuzzy match system variations.

Option:

Provide a GUI for the user for them to enter their own set of words for a custom spam dictionary and ham dictionary. Suggest alternate spellings. Allow user to enable fuzzy matching. Allow regular expressions.

Updates:

Some people choose user names or proper nouns which are purposely obfuscated (e.g. h@cker). This can lead to false positives.

Ignore non-alpha characters in the beginning and end of words. They are often legitimate.

John Graham Cummings wrote article with excerpt in Appendix A below.

In addition to obfuscating spammy words, phishers/spammers also started to obfuscate real legitimate domain addresses to trick users to thinking that they were legit. For example, micr0soft.com instead of microsoft.com Therefore, we will start checking for obfuscation of popular legit domain names especially banking/financial/government sites.

Multiple obfuscation detection and deobfuscation algorithms can be combined.

Multi-word combinations can be specified. For example, dpam's chained tokens.

Can specify a pair of sequential tokens. Nice if can specify an arbitrarily long sequence of tokens.

Appendix A: Sort letters in words to de-obfuscate What: Permuting the letters inside a word; the word is still readable by humans I finlay was able to lsoe the wieght I have been sturggling to lose for years! And I couldn't bileeve how simple it was! Amizang pacth makes you shed the ponuds! It's Guanarteed to work or your menoy back!

good way to deal with

Cmabirgde Uinersvtiy Spam is to sort the letters in each word over 6 letters and use the sorted word as input to the spam filter. That way you eliminate any of the permutations. I stated that there was a low probability the English words over 5 letters had the same letters in them.

I did a quick test using the standard dictionary found on my Linux system which contains 45,000 English words. This table shows that average number of words with the same letters for words of different lengths. For 6 letter words there are on average 1.13 words with the same letters. Once you reach 10 letter words they are all unique.

Length 2, average 1.08
Length 3, average 1.2
Length 4, average 1.3
Length 5, average 1.22
Length 6, average 1.13
Length 7, average 1.07
Length 9, average 1.01
Length 10+, average 1

Most common spammy words have no similar words (e.g. there are no anagrams of 'viagra'), although 'cialis' does turn out to be similar to 'silica'. As I was looking at the similar words I came across the following amusing sets of words that are all anagrams of each other:

1. proust spout stupor - - - Yes, you'll be in a Proust-spout stupor after reading "A la recherche du temps perdu"
2. mastering streaming emigrants - - - A problem for all developed countries
3. corset escort sector - - - 'nuff said.

Appendix B: Algorithm 1 (Preferred):

Manually create a list of spam words (e.g. viagra) and non-spam words.

For every word or sequence of words in the message:
1) Skip if the word is whitelisted (in the list of non-spam words)
2) Compute the obfuscation index. The weighted number of non-alpha character transformations within the word.
3) Compute distance from each of the spam words. Number of transformations required to get from the word to the spam word.
4) If the distance is within a threshold then detect as matched. The threshold depends on the liklihood that the word was unintentionally obfuscated.
5) If matched then penalize in proportion to the obfuscation index. The more likely the word was intentionally obfuscated, the higher the spam score.
6), Add both the original token and the deobfuscated token to the training database. Use the deobfuscated token for "bulk" detection and message "sameness" detection.
7) The original obfuscated spam token can be added to a list of spam words which is explicitly searched for in future messages.

Can collect list of obfuscated spam words:

For every message, compare every obfuscated word with an english and foreign dictionary. Send the most useful matching words.

More useful is if the normalized word has high spam probability, is a trademarked word, is a long word, and occurs frequently.

Algorithm 2:

Manually create a list of spam words and non-spam words.
a) Create deobfuscated copy of message: All non-alpha characters are mapped to an alpha character. For example, the number 1 is mapped to 1. White space is deleted.
b) Search for spam words in both the original text and in the deobfuscated text. If they only appear in the deobfuscated text and not in the original text, then the message is penalized (ie. higher spam score).

Algorithm 3:

Manually create a list of spam words and non-spam words.

A map of all letters and their obfuscated versions needs to be created. This map will be used to generate variations of a spam word and consequently will be used to create spam dictionaries. If the number of variations is very high, several penalties can be assigned to limit the number of variations. For example, we can limit the number of letters that can be obfuscated at one time in a spammy word to 2 or 3 depending on the length of the spam word. The proposed design must allow this. Also, obfuscation indexed must be calculated. Once the variations of a spammy word are created, message buffer's tokens will be searched against the hash map of these variations. Here is how the dictionary creation and lookup works:

Algorithm utilizes 3 different tables. Variations of spam words are created only using one of these tables to keep the number of variations and memory usage at an acceptable level. This table has mappings for all the possible ascii art and non-unique ways of representing letters including html entities that can be represented as characters. Once the variations are created, they are inserted in a hash_map object. The reason hash_map is used is to provide a quick runtime lookup. It is also possible to add all permutations of a spam word that starts with the first letter of a spam word and ends with the last letter of a spam word. This is optional.

The other 2 tables of characters are utilized during lookup. Both of these 2 character maps are character arrays of 256 elements. In both tables, letters are uniquely represented. One map is a little more flexible than the other to accommodate for deciding if a character is used as an ascii part, i.e. Part of one of the letters of a letter or as an extra character.

For example: "\.//i/a/g/r/a Just getting rid of non-alpha characters would be wrong here to match this obfuscated version to a real spam word. Therefore, the more strict map is used first, if there is no match, the second map is used. All alpha numeric character removal is done in lookup during these convertions (using these 2 tables). Lookup returns the real spam word that the token meant to represent. It also returns several versions of converted tokens to calculate obfuscation index. Once the lookup is done, obfuscation index can be calculated. None of these use edit distance, but if need be, there is a function available to calculate the edit distance of two strings. Edit distance is used in obfuscation index calculations. For an explanation of how edit distance works please look here: http://www.merriampark.com/ld.htm Algorithm 4:
1) Search for all strings which can possibly match spam word above threshold. Look for strings which match beginning of word and end of word, has all the right characters, does not have extra characters, and has the characters in the right order. Can start with the first letter and keep appending until a minimum threshold is reached.
2) Compare matching string against ham dictionary and skip if match.
3) For each character in the string, compute the spam probability. Spam probability is equal to the likelyhood that the character's purpose was to obfuscate. Non-alphabetic characters, repeated characters, whitespace, HTML entities, HTML tags, etc. are spam tricks. Count each. Every alphabetic character is a ham indicator.
4) Combine spam probabilities with ham probabilities. Add to regex weight proportional to the spam probability.

Optimization strategies:
a) Create array of non-alphabet to string tokens. (e.g. "\/" to v_token__1)
b) Create array of non-alphabet string tokens to alphabet mapping.

Algorithm 5:
In addition, would like to build a system which can learn new tricks being used by spammers.
Create a spam dictionary of common spam terms and phrases.
Create a ham dictionary of common legitimate words. Include english, german, spanish, etc.
Include words collected from legitmate email and newsletters. Include trademark names, city, country, states, major domain names, and stock symbols and company names.
Collect known spam.
For each word/phrase in the spam dictionary, search for a "close" match in the spam message.
Compute the number and type of transformations (e.g. letter subsitutions) required to convert the word/phrase in the spam message to the word/phrase in the spam dictionary.
Each type of transformation has a weight. Sum the weight of all transformations required to match the word/phrase in the spam dictionary. If it is below a threshold then assume that it is close enough.
For the word/phrase in the spam message which is close enough, try and match that word/phrase to the ham dictionary. Sum the weight of all transformations required to match the word/phrase to the ham dictionary. Divide this ham transformation weight by the weight of the spam transformation. If it is below a threshold, then assume that the word/phrase in the spam message is a new "spam indicator")
Create a list of "spam indicators" and search for them in incoming messages
deobfuscate the text to aid in "bulk" detection and message "sameness" detection
add both obfuscated and deobfuscated text to the training database (spam/ham dictionary)

Figure 3:
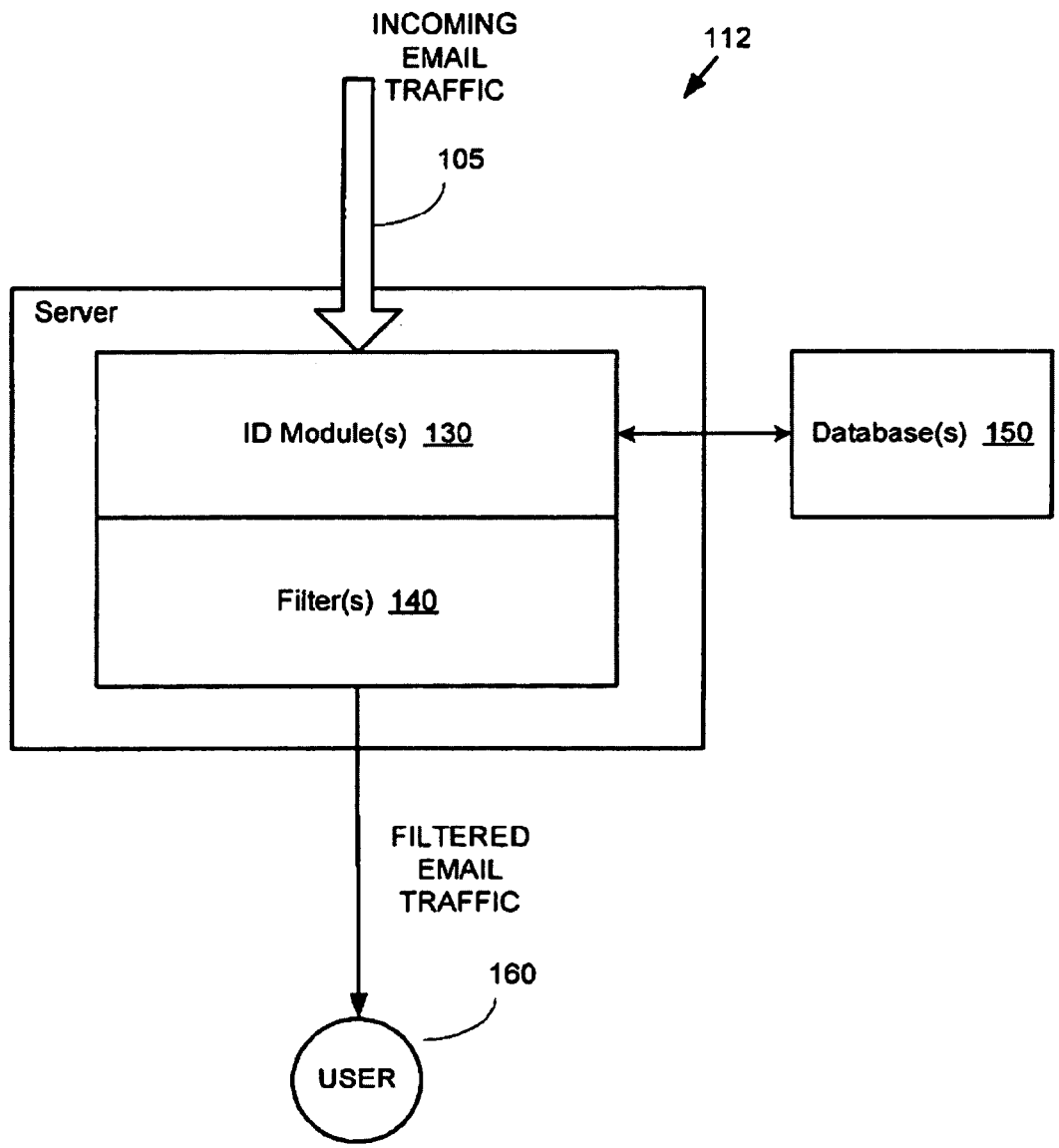
FIG. 3 shows an exemplary system that can be used to implement embodiments of the invention.

Incoming email traffic is processed by identification (ID) modules 130, e.g., as shown in the exemplary system 112 of FIG 3. ID modules 130 can each be independent processes, devices or other types of functionality that are designed to evaluate the similarity between two or more email messages, or between an email message and other reference data. For example, a module 130 can be a software process that determines a word count in the body of an email message. Another module 130 can eliminate minor differences in grammar and language properties (e.g., eliminating the distinction between number, tense and person in grammar) and then subject the email text to a hash function. Another module 130 type can use a database 150 to assign values to words and compute an overall value to an email message or other information in an email transmission. Another module 130 type can attempt to deduce meanings or concepts conveyed in an email message. In general, any type of module that performs a comparison on an email message in an attempt to find a level or degree of "sameness" of the email message with other email messages or with a reference datum or data structure can be employed.

Modules 130 are used to produce a value or values that indicate the degree of certainty that the module assigns to an email message to indicate whether the email message is matched to another email message or group of email messages (referred to as a category). In a preferred embodiment, a module 130 can merely produce a "match" or "no match" with a message category. For example, there maybe tens or hundreds or more different categories to which a candidate email message may be compared. Each module can produce a conclusion as to whether the candidate email message is matched to one or more of the categories. Alternatively, the modules 130 can produce a "degree of certainty" value (e.g., from 0 to 100) that indicates the degree to which the module ascertains that the message is the same as the messages in each category. Other types of module comparisons and types of module output are possible. Typically, the checking for sameness is performed against one or more messages, or other information representing message content, obtained from a source such as a database 150.

Filters 140 use the results of the module 130 comparisons to determine whether the email traffic 105 is delivered to a user 160. Messages that are delivered, or "passed," are considered legitimate, or desired, messages. Messages that are undelivered are said to be blocked, or undesirable, messages. In a preferred embodiment, a filter 140 performs a spam check on messages that are considered to be "bulk" messages. Bulk messages are those messages in a category that contains over X messages, where X is a predetermined number. Messages that are not bulk messages are automatically passed through to the intended recipient, or user 160. Bulk messages, on the other hand, are subjected to further scrutiny and checking to determine whether the messages are spam. Typically, this is a determination as to whether the message is of a commercial nature, i.e., is designed to benefit the sender monetarily or in some other fashion. The spam checking can be by any means as is known in the art.

Ideally, a system would be able to tell with certainty whether a message is bulk or not. In such a case, all non-bulk messages can be considered as not spam. However, since the bulk detection is not perfect, a preferred embodiment uses the probability that email is bulk combined with the probability that the email content may be unwanted to derive the overall probability that email is bulk and unwanted.

Although the invention has been discussed with reference to specific embodiments thereof, these embodiments are illustrative, and not restrictive, of the invention. For example, although specific characters are provided as examples other embodiments can use other characters in a similar manner. Other unobtrusive characters rather than a period can be the object of deletion, substitution or other processing. Commas, slashes, dashes, spaces, etc., can all be similarly processed. Many such variations are possible for the different rules and other functions described herein.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium or transmission that can contain, store, communicate, propagate, or transport the program for use by or in connection with the instruction execution system, apparatus, system or device. The computer readable carrier can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention, but that the invention will include any and all embodiments and equivalents falling within the scope of the appended claims.

What is claimed is:

1. A method for analyzing character codes in text of a message to determine a probability that the message is spam, the method comprising:
    (a) receiving a message that includes character codes in text of the message;
    (b) identifying character codes of the text that are likely being used to obfuscate a word or phrase of the text;
    (c) deobfuscating each word or phrase of the text that is identified at step (b) as likely being obfuscated, to produce deobfuscated text; and
    (d) determining an extent that the character codes of the text are identified as likely being used to obfuscate a word or phrase of the text by determining one or more of the following
        a quantity of words or phrases identified at step (b) as likely being obfuscated;
        which particular words or phrases are identified at step (b) as likely being obfuscated, and
    (e) analyzing the deobfuscated text by comparing the deobfuscated text to text of one or more other messages known to be spam;
    (f) determining a probability that the message is spam based on both
        (i) results of the analyzing the deobfuscated text, by comparing the deobfuscated text to text of one or more other messages known to be spam, performed at step (e), and
        (ii) results of the determining the extent that the character codes of the text are likely being used to obfuscate a word or phrase of the text, performed at step (d);
        wherein at least steps (b), (c), (d), (e) and (f) are performed by one or more processors.

2. The method of claim 1, wherein
the following rules are used at step (f), when determining the probability that the message is spam:
    the higher the quantity of words or phrases of the message identified as likely being obfuscated the higher the probability that the message is spam;
    identifying some particular words or phrases as likely being obfuscated increases the probability that the message is spam more than identifying other particular words or phrases as likely being obfuscated; and
    the more similar the deobfuscated text is to the text of at least one of the one or more other messages known to be spam the higher the probability the message is spam.

3. The method of claim 1, wherein one of a plurality of rules used at step (f), when determining the probability that the message is spam, specifies that the higher the quantity of words or phrases of the message identified as likely being obfuscated the higher the probability that the message is spam.

4. The method of claim 1, wherein one of a plurality of rules used at step (f), when determining the probability that the message is spam, specifies that identifying some particular words or phrases as likely being obfuscated increases the probability that the message is spam more than identifying other particular words or phrases as likely being obfuscated.

5. The method of claim 4, wherein step (f) includes taking into account whether words that are likely being obfuscated are known to be used in spam.

6. The method of claim 5, wherein step (f) includes determining that words that are likely being obfuscated are known to be used in spam is used to increase the probability that the message is spam.

7. The method of claim 1, wherein one of a plurality of rules used at step (f), when determining the probability that the message is spam, specifies that the more similar the deobfuscated text is to the text of at least one of the one or more other messages known to be spam the higher the probability the message is spam.

8. The method of claim 1, wherein step (f) includes taking into account which obfuscation techniques were likely used to obfuscate a word or phrase of the text, when determining the probability that the message is spam.

9. The method of claim 8, wherein step (d) includes detecting use of some obfuscation techniques increases the probability that the message is spam more than detecting use of other obfuscation techniques.

10. The method of claim 1, wherein:
    step (b) includes identifying one or more words that are likely misspelled;
    step (c) includes replacing one or more words that are likely misspelled with one or more words that were likely intended if the one or more words were correctly spelled, when producing the deobfuscated text;
    step (d) includes searching the deobfuscated text for words and phrases that are known to be used in spam;
    step (e) includes comparing the deobuscated text to text of one or more other messages known to be spam to determine a degree of sameness;
    step (f) includes
        taking into account whether one or more word that is likely misspelled is a word or is part of a phrase that is known to be used in spam, when determining the probability that the message is spam; and
        also taking into account the degree of sameness when determining the probability that the message is spam.

11. The method of claim 10, wherein step (f) includes determining that words that are likely being misspelled are known to be used in spam is used to increase the probability that the message is spam.

12. The method of claim 1, wherein the deobfuscating performed at step (c) includes one or more techniques selected from the group consisting of:
    replacing a non-alphanumeric character with an alphanumeric character;
    deleting a white space character;
    replacing a number character with a letter character;
    replacing one or more symbol character with a letter character; and
    replacing a non-English character with an English character.

13. A machine-readable storage medium including instructions executable by one or more processors to analyze character codes in text of a message to determine a probability that the message is spam, machine-readable storage medium comprising:
    instructions to receive a message that includes character codes in text of the message;
    instructions to identify character codes of the text that are likely being used to obfuscate a word or phrase of the text;
    instructions to deobfuscate each word or phrase of the text that is identified as likely being obfuscated, to produce deobfuscated text;

instructions to determine an extent that the character codes of the text are identified as likely being used to obfuscate a word or phrase of the text by determining one or more of the following
- a quantity of words or phrases identified as likely being obfuscated, and
- which particular words or phrases are identified as likely being obfuscated;

instructions to analyze the deobfuscated text by comparing the deobfuscated text to text of one or more other messages known to be spam; and instructions to determine a probability that the message is spam based on both
- (i) results of analysis of the deobfuscated text by comparing the deobfuscated text to text of one or more other messages known to be spam, and
- (i) results of determining the extent that the character codes of the text are likely being used to obfuscate a word or phrase of the text.

14. The machine-readable storage medium of claim 13, wherein the instructions to determine a probability that the message is spam include instructions that the higher the quantity of words or phrases of the message identified as likely being obfuscated the higher the probability that the message is spam.

15. The machine-readable storage medium of claim 13, wherein the instructions to determine a probability that the message is spam include instructions that identifying some particular words or phrases as likely being obfuscated increases the probability that the message is spam more than identifying other particular words or phrases as likely being obfuscated.

16. The machine-readable storage medium of claim 15, wherein the instructions to determine a probability that the message is spam include instructions that the more similar the deobfuscated text is to the text of at least one of the one or more other messages known to be spam the higher the probability the message is spam.

17. The machine-readable storage medium of claim 13, wherein the instructions to determine a probability that the message is spam include instructions that take into account which obfuscation techniques were likely used to obfuscate a word or phrase of the text, when determining the probability that the message is spam.

18. The machine-readable storage medium of claim 13, wherein:
- the instructions to identify character codes of the text that are likely being used to obfuscate a word or phrase of the text, include instructions to identify one or more words that are likely misspelled;
- the instructions to deobfuscate any word or phrase of the text that is likely being obfuscated, to produce deobfuscated text, include instructions to replace one or more words that are likely misspelled with one or more words that were likely intended if the one or more words were correctly spelled;
- the instructions to determine a probability that the message is spam include instructions to search the deobfuscated text for words and phrases that are known to be used in spam, and instructions that take into account whether one or more word that is likely misspelled is a word or is part of a phrase that is known to be used in spam.

19. The machine-readable storage medium of claim 13, wherein the instructions to deobfuscate any word or phrase of the text that is likely being obfuscated, to produce deobfuscated text, include instructions selected from the group consisting of:
- instructions to replace a non-alphanumeric character with an alphanumeric character;
- instructions to delete a white space character;
- instructions to replace a number character with a letter character;
- instructions to replace one or more symbol character with a letter character; and
- instructions to replace a non-English character with an English character.

20. A system to analyze character codes in text of a message to determine a probability that the message is spam, comprising:
- at least one processor;
- machine-readable storage medium including instructions that are executable by the at least one processor, the instructions including
  - instructions to receive a message that includes character codes in text of the message;
  - instructions to identify character codes of the text that are likely being used to obfuscate a word or phrase of the text;
  - instructions to deobfuscate each word or phrase of the text that is identified as likely being obfuscated, to produce deobfuscated text;
  - instructions to determine an extent that the character codes of the text are identified as likely being used to obfuscate a word or phrase of the text by determining one or more of the following
    - a quantity of words or phrases identified as likely being obfuscated, and
    - which particular words or phrases are identified as likely being obfuscated;
  - instructions to analyze the deobfuscated text by comparing the deobfuscated text to text of one or more other messages known to be spam; and
- instructions to determine a probability that the message is spam based on both
  - (i) results of analysis of the deobfuscated text, by comparing the deobfuscated text to text of one or more other messages known to be spam, and
  - (ii) results of determining the extent that the character codes of the text are likely being used to obfuscate a word or phrase of the text.

* * * * *

UNITED STATES PATENT AND TRADEMARK OFFICE
CERTIFICATE OF CORRECTION

PATENT NO. : 7,644,127 B2 Page 1 of 1
APPLICATION NO. : 11/077506
DATED : January 5, 2010
INVENTOR(S) : Tonny Yu It is certified that error appears in the above-identified patent and that said Letters Patent is hereby corrected as shown below:

In Claim 1, at Column 13, Line 22, replace "obfuscated;" with --obfuscated, and--; and In Claim 1, at Column 13, Line 24, replace "obfuscated, and" with --obfuscated;--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,644,127 B2  Page 1 of 1
APPLICATION NO. : 11/077506
DATED : January 5, 2010
INVENTOR(S) : Tonny Yu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Sixteenth Day of November, 2010

David J. Kappos
*Director of the United States Patent and Trademark Office*